(12) United States Patent
Rankin

(10) Patent No.: US 11,105,934 B2
(45) Date of Patent: Aug. 31, 2021

(54) DETERMINING PROXIMITY AND ATTRACTION OF OBJECTS WITHIN A COORDINATE SYSTEM

(71) Applicant: John Rankin, Columbus, OH (US)

(72) Inventor: John Rankin, Columbus, OH (US)

(73) Assignee: Rankin Labs, LLC

( * ) Notice: Subject to any disclaimer, the term of this patent is extended or adjusted under 35 U.S.C. 154(b) by 0 days.

(21) Appl. No.: 16/804,789

(22) Filed: Feb. 28, 2020

(65) Prior Publication Data

US 2021/0041578 A1 Feb. 11, 2021

Related U.S. Application Data

(60) Provisional application No. 62/883,950, filed on Aug. 7, 2019.

(51) Int. Cl.
*G01S 19/51* (2010.01)
*G06T 7/292* (2017.01)

(52) U.S. Cl.
CPC .............. *G01S 19/51* (2013.01); *G06T 7/292* (2017.01)

(58) Field of Classification Search
CPC ................................ G01S 19/51; G06T 7/292
See application file for complete search history.

(56) References Cited

U.S. PATENT DOCUMENTS

| | | | |
|---|---|---|---|
| 3,688,090 A | 8/1972 | Rankin | |
| 6,023,724 A | 2/2000 | Bhatia et al. | |
| 6,567,416 B1 | 5/2003 | Chuah | |
| 6,714,985 B1 | 3/2004 | Malagrino et al. | |
| 6,757,248 B1 | 6/2004 | Li et al. | |
| 7,103,025 B1 | 9/2006 | Choksi | |
| 8,374,091 B2 | 2/2013 | Chiang | |
| 8,397,151 B2 | 3/2013 | Salgado et al. | |
| 9,350,663 B2 | 5/2016 | Rankin | |
| 9,405,016 B2 | 8/2016 | Yim | |
| 9,615,064 B2 | 4/2017 | Millar et al. | |
| 2001/0017844 A1 | 8/2001 | Mangin | |
| 2001/0019614 A1 | 9/2001 | Madoukh | |
| 2002/0041592 A1 | 4/2002 | Van Der Zee et al. | |
| 2002/0054570 A1 | 5/2002 | Takeda | |
| 2002/0071436 A1 | 6/2002 | Border et al. | |
| 2003/0031198 A1 | 2/2003 | Currivan et al. | |
| 2004/0073364 A1 | 4/2004 | Jung et al. | |
| 2005/0286517 A1 | 12/2005 | Babbar et al. | |
| 2006/0002681 A1 | 1/2006 | Spilo et al. | |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Alan D Hutchinson
(74) *Attorney, Agent, or Firm* — Standley Law Group LLP

(57) ABSTRACT

Systems and methods for determining the proximity and attraction between a stationary object and a number of moving objects are provided. First and second location measurement of each of the moving objects are taken and applied to a measurable coordinate system centered around the stationary object. The converted location measurements are transformed into a proximity/attraction value ("PAV"). Where the PAV is less than one, the object is moving away from the stationary object. Where the PAV is greater than one, the object is moving towards the stationary object.

20 Claims, 4 Drawing Sheets

(56) References Cited

U.S. PATENT DOCUMENTS

| | | |
|---|---|---|
| 2006/0034317 A1 | 2/2006 | Hong et al. |
| 2006/0133364 A1 | 6/2006 | Venkatsubra |
| 2006/0259587 A1 | 11/2006 | Ackerman et al. |
| 2007/0028121 A1 | 2/2007 | Hsieh |
| 2007/0223395 A1 | 9/2007 | Lee et al. |
| 2010/0103830 A1 | 4/2010 | Salgado et al. |
| 2011/0149891 A1 | 6/2011 | Ramakrishna |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2013/0162824 A1 | 6/2013 | Sung et al. |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2014/0309923 A1 | 10/2014 | Ricci |
| 2015/0100613 A1 | 4/2015 | Osiecki et al. |
| 2015/0168175 A1 | 6/2015 | Abramson et al. |
| 2015/0229714 A1 | 8/2015 | Venkatsubra et al. |
| 2015/0241231 A1 | 8/2015 | Abramson et al. |
| 2015/0336015 A1 | 11/2015 | Blum et al. |
| 2016/0171399 A1 | 6/2016 | Santhanam et al. |
| 2016/0269294 A1 | 9/2016 | Rankin |
| 2017/0067747 A1 | 3/2017 | Ricci |
| 2017/0090872 A1 | 3/2017 | Mathew et al. |
| 2018/0018147 A1 | 1/2018 | Sugawara |
| 2018/0102975 A1 | 4/2018 | Rankin |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

DETERMINING PROXIMITY AND ATTRACTION OF OBJECTS WITHIN A COORDINATE SYSTEM

CROSS-REFERENCE TO RELATED APPLICATIONS

This application claims the benefit of U.S. Provisional Application No. 62/883,950 filed Aug. 7, 2019, the disclosures of which are hereby incorporated by reference as if fully restated herein.

TECHNICAL FIELD

Exemplary embodiments relate generally to systems and methods for determining proximity and attraction of objects within a coordinate system.

BACKGROUND AND SUMMARY OF THE INVENTION

The location of objects moving along the surface of a globe can be identified by a standardized system of latitude and longitude coordinates. Latitude is a measurement on a globe or map of locations north or south of the Equator. Geographic latitude is the arc subtended by an angle at the center of the Earth and measured in a north-south plane poleward from the Equator. Longitude is a measurement of location east or west of the prime meridian at Greenwich, the specially designated imaginary north-south line that passes through both geographic poles and Greenwich, London.

The location of any object on the surface of the earth can be described with a high degree of accuracy by referencing its latitude and longitude location. For example, a point 85° W longitude and 45° N latitude is a point that is 85° west of the prime meridian and 45° north of the equator. This mechanism of location was first developed by sailors who needed to determine their exact location upon the globe, where objects on land could no longer be seen due to the curvature of the earth. There are 360 degrees of latitude and longitude in the complete circumnavigation of the globe. Generally, measurements associated with degrees are further divided into minutes and seconds. However, for the purpose of modern calculations, a more functional use of a fractional decimal string of numbers has replaced the traditional use of minutes and seconds. Therefore, 85° west, 34 minutes and 25 seconds can be expressed as 85.56424765°. This mathematical presentation allows for a more practical use, and can be extended with additional digits to the right of the decimal point.

In our modern world, objects can be located using Global Positioning Systems (GPS) and their coordinates on the surface of the planet are generally expressed in latitude/longitude values. This may be accomplished using a series of geo-synchronized orbited satellites whose radio signals can be coordinated to determine a location on the globe. As objects move, their position can be tracked and the relationship between these objects may again be expressed in latitude/longitude values.

While this latitude/longitude coordinate system was developed for positioning upon the surface of a globe, the mechanism works effectively within a flat map application as well. While the curvature lines wrap the global surface, within a small enough geography the observation of curvature is immaterial. This allows local mapping and location determination to function on a two-dimensional map without concern over the small curvature that is effectively inconsequential.

As objects move about within this coordinate system, what is needed is a system and method for determining the relationship between objects. For example, without limitation, to determine if an object is moving towards or away from a specific definable point, to determine the amount of closeness or movement in a specific direction to a specific definable point, to determine which objects within the coordinate plane are, on average, attracted to the point, or overall moving in the direction of the point, or within a given proximity of the point.

A proximity determination permits the observer to quantifiably measure the level of attraction and affinity between objects. Mere proximity theory presents the concept that familiarity, friendship, and relationships develop based upon simple closeness and frequent contact. Therefore, by developing a systematic method to measure these orientations, it is possible to predict the behavior that derives from the proximity.

A numerical observation value can be attributed to two objects. The first is a stationary observation point of an object of interest. The second is an object in motion that can be observed at one or more position(s) relative to a first object. A number may be produced which identifies the direction or attraction of the second object towards the first object with great precision. Furthermore, the closeness, repeated frequency of movement, and level of interest between the objects can be measured.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
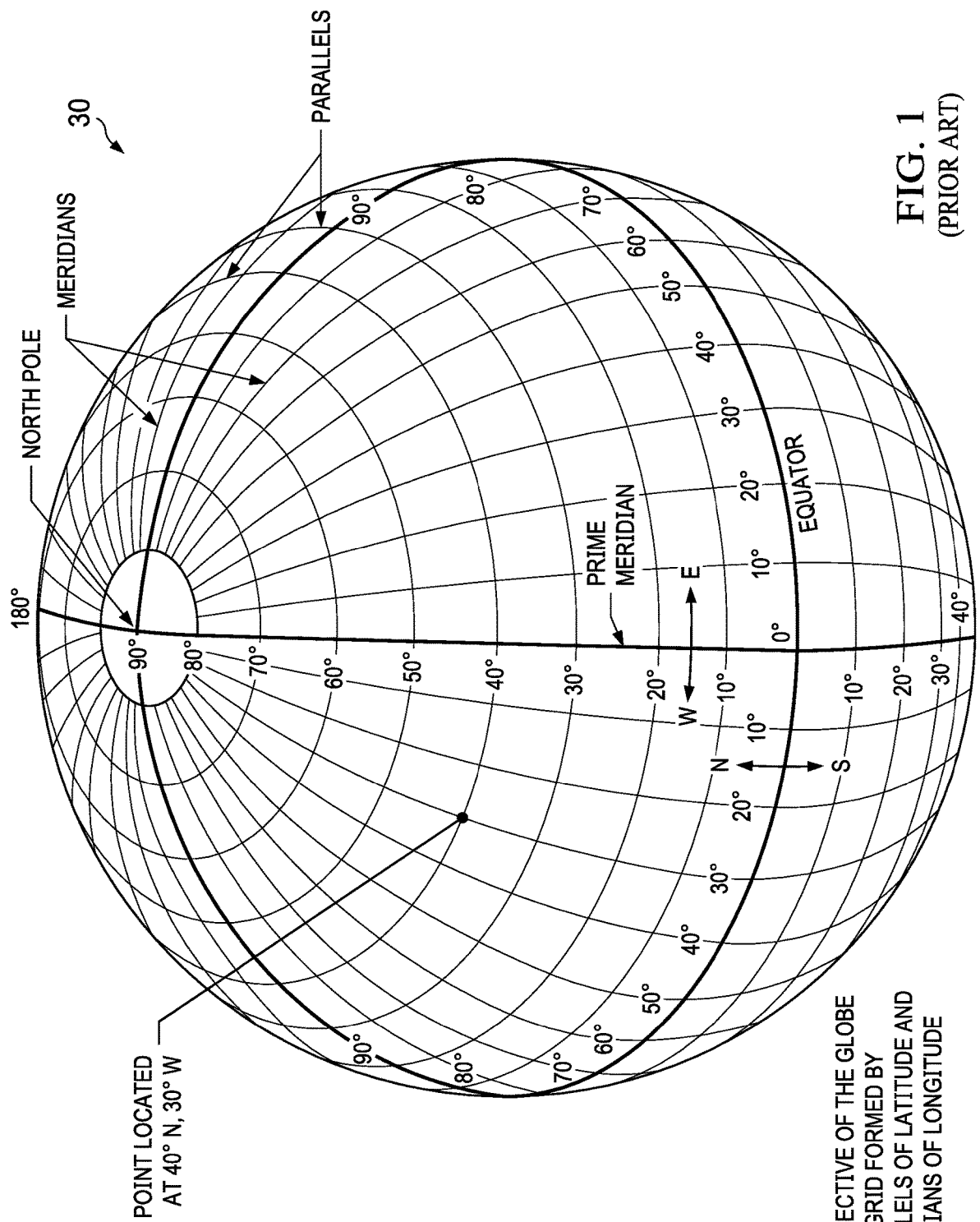
FIG. 1 is an exemplary longitudinal and latitudinal coordinate system on an image of the globe.

FIG. 1 is an exemplary longitudinal and latitudinal coordinate system 30 on an image of the globe. For the purposes of explanation, a longitudinal and latitudinal coordinate system 30 is shown and discussed herein. However, those of skill in the art will recognize that any kind, type, and/or size coordinate system 30 may be used, particularly one which allows for a dependable observation of location.

Figure 2:
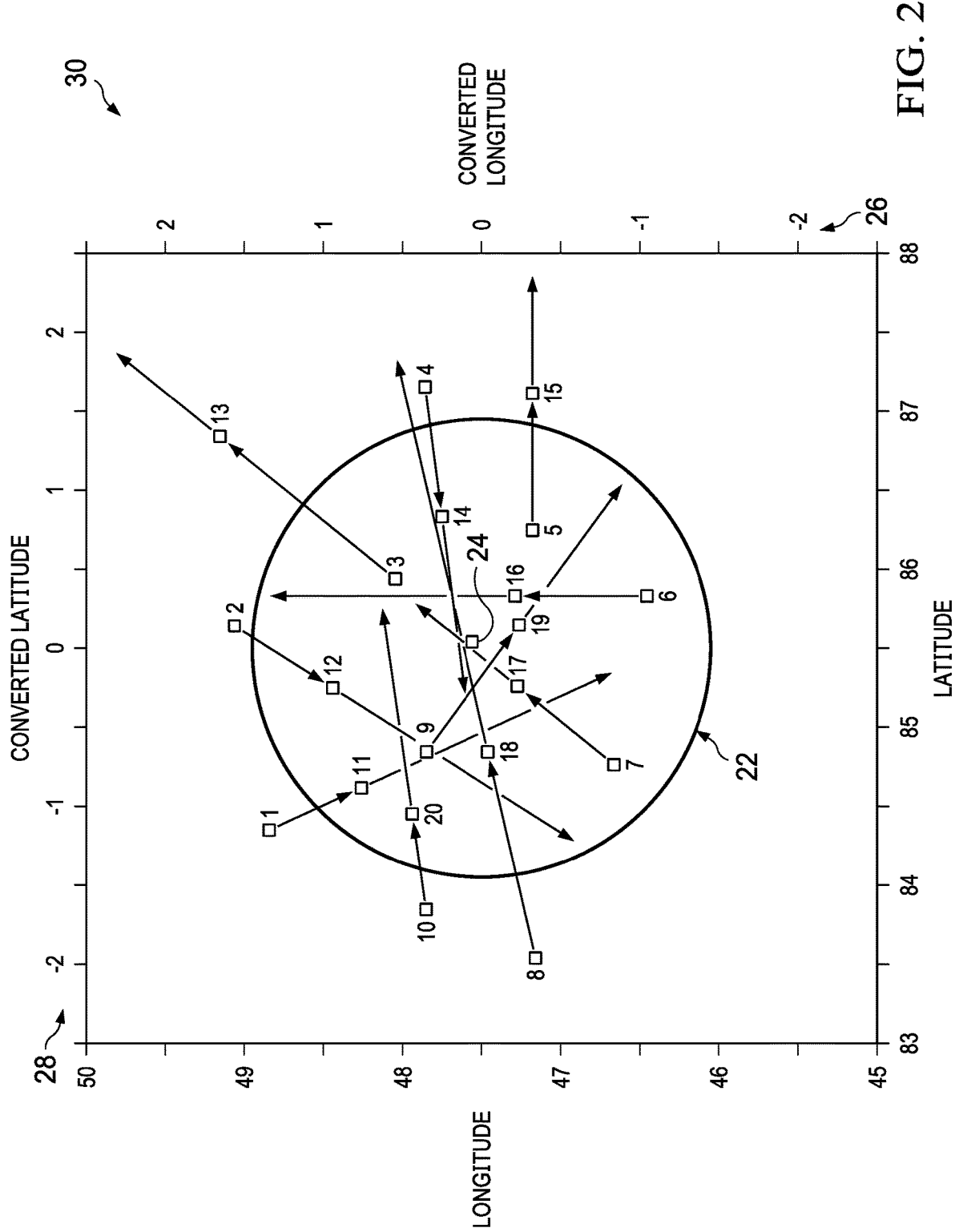
FIG. 2 illustrates exemplary object movements with respect to an exemplary coordinate system.
Figure 3:
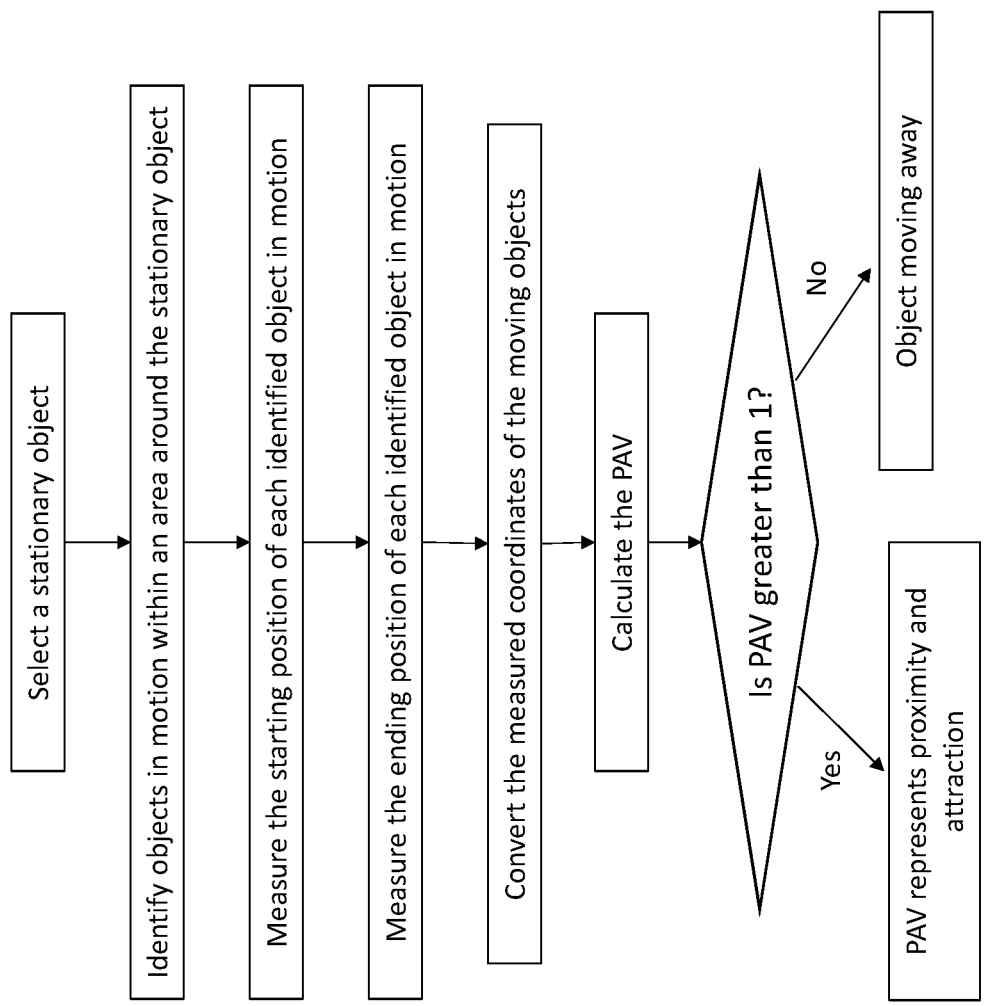
FIG. 3 is a flow chart with exemplary logic for determining proximity and attraction between a stationary object and a moving object.

FIG. 2 illustrates exemplary movement of objects 1-10 with respect to an exemplary coordinate system 30. FIG. 3 is a flow chart with exemplary logic for determining proximity and attraction between a stationary object 24 and the moving objects 1-10. The stationary object 24 may be observed to determine its location. A quantifiable value for all objects 1-10 moving within an area 22 surrounding the stationary object 24 may be determined. The area 22 may be determined as a radius from the stationary object 24, though any size or shape area 22 is contemplated. This quantifiable value may express direction, proximity, and attraction between each moving object 1-10 and the stationary object 24. The area 22 may be any predetermined distance, or series of distances, from the stationary object 24. For example, without limitation, the area 22 may partially or wholly surround the stationary object 24.

A stationary object 24 may be selected. Preferably, the stationary objection 24 is one for which it is desirable to determine which other objects 1-10 are in proximity or attracted to said stationary object 24. The selection process may involve determining the specific location of the stationary object 24 and ensuring that the object 24 is stationary for a period of observation. For example, without limitation, FIG. 2 illustrates a series of objects 1-10 within a measurable coordinate grid 30. The stationary object 24 is in the center of the grid 30, though such is not required. Within the latitude/longitude coordinate system 30, the stationary object 24 is at latitude 85.5 and longitude 47.5. Of course, these locations and measurements are merely exemplary and are not intended to be limiting.

One or more objects 1-10 in motion may be identified which are within the area 22 around the stationary object 24. The area 22 may be a predetermined distance, shape, some combination thereof, or the like. In exemplary embodiments, the area 22 is determined to detect objects 1-10 likely to be attracted to the stationary object 24. For the purpose of illustration, FIG. 2 presents ten separate objects 1-10 that are in motion, though any number of objects of any type may be analyzed in accordance with the present disclosures. These objects 1-10 have exactly one movement shown, while multiple movements are may be analyzed in accordance with the present disclosures. Each object 1-10 is inventoried in Table 1 to serve as examples, without limitation.

TABLE 1

Inventory of Objects

| | Lat. | Long. | Converted Lat. | Converted Long. | Converted$_2$ Lat. | Converted$_2$ Long. | Converted$_2$ Lat. * Long. (x, y) |
|---|---|---|---|---|---|---|---|
| 1. | 84.3 | 48.8 | −1.2 | 1.3 | 1.44 | 1.69 | 2.4336 |
| 2. | 85.6 | 49.0 | 0.1 | 1.5 | 0.01 | 2.25 | 0.0225 |
| 3. | 85.9 | 48.0 | 0.4 | 0.5 | 0.16 | 0.25 | 0.0400 |
| 4. | 87.1 | 47.8 | 1.6 | 0.3 | 2.56 | 0.09 | 0.2304 |
| 5. | 86.2 | 47.1 | 0.7 | −0.4 | 0.49 | 0.16 | 0.0784 |
| 6. | 85.8 | 46.4 | 0.3 | −1.1 | 0.09 | 1.21 | 0.1089 |
| 7. | 84.7 | 46.6 | −0.08 | −0.9 | 0.64 | 0.81 | 0.5184 |
| 8. | 83.5 | 47.1 | −2.0 | −0.4 | 4.00 | 0.16 | 0.6400 |
| 9. | 84.8 | 47.9 | −0.7 | 0.4 | 0.49 | 0.16 | 0.0784 |
| 10. | 83.8 | 47.9 | −1.7 | 0.4 | 2.89 | 0.16 | 0.4624 |
| Objects at Beginning of Movement | | | | | | | |
| 11. | 84.6 | 48.2 | −0.9 | 0.7 | 0.81 | 0.49 | 0.3969 |
| 12. | 85.2 | 48.4 | −0.3 | 0.9 | 0.09 | 0.81 | 0.0729 |
| 13. | 86.8 | 49.1 | 1.3 | 1.6 | 1.69 | 2.56 | 4.3264 |
| 14. | 86.3 | 47.7 | 0.8 | 0.2 | 0.64 | 0.04 | 0.0256 |
| 15. | 87.0 | 47.1 | 1.5 | −0.4 | 2.25 | 0.16 | 0.3600 |
| 16. | 85.8 | 47.2 | 0.3 | −0.3 | 0.09 | 0.09 | 0.0081 |
| 17. | 85.2 | 47.2 | −0.3 | −0.3 | 0.09 | 0.09 | 0.0081 |
| 18. | 84.8 | 47.4 | −0.7 | −0.1 | 0.49 | 0.01 | 0.0049 |
| 19. | 85.6 | 47.2 | 0.1 | −0.3 | 0.01 | 0.09 | 0.0009 |
| 20. | 84.4 | 47.9 | −1.1 | 0.4 | 1.21 | 0.16 | 0.1936 |
| Objects After Single Movement | | | | | | | |
| | 85.5 | 47.5 | 0.0 | 0.0 | n/a | n/a | n/a |
| Stationary Object | | | | | | | |

Each object 1-10 is labeled twice, once for its beginning position (items 1-10) and once for its ending (items 11-20). Labeling is provided such that the beginning position of a given object 1-10 is identified as items 1-10, and the ending position of a given object 1-10 is increased by 10 to indicate its ending position as items 11-20. For example, object 1 is provided in its beginning position as item 1, and in its ending position as item 11, object 2 is provided in its beginning position as item 2, and in its ending position as item 12, and so forth. An arrow in the illustration shows the direction of movement of the given object 1-10, and its trajectory were it to continue on a straight path.

In order to calculate a Proximity/Attraction Value (PAV), at least two positional observations of each of the objects 1-10 in motion may be made. These positions 1-10 and 11-19 may be recorded using the same coordinate system 30 that records the stationary object 24. For example, without limitation, the observations of all ten moving objects 1-10 in FIG. 2 are recorded in the first two columns of Table 1.

All observations may be converted from the observation coordinate system 30 into a coordinate system 30 that places the stationary object 24 in the center of the coordinates. This may be accomplished using the formulas in Formula 1.

$$a - s_1 = c_1$$

$$b - s_2 = c_2$$

$$c - s_1 = c_3$$

$$d - s_2 = c_4 \quad \text{Formula 1}$$

In the formulas provided in Formula 1, "a" may be the latitude value of a beginning movement for an object 1-10, "b" may be the longitudinal value of a beginning movement for an object 1-10, "c" may be the latitude value of an ending movement for an object 11-20, "d" may be the longitudinal value of an ending movement of an object 11-20, $s_1$ may be the latitudinal value of the stationary object 24, and $s_2$ may be the longitudinal value of the stationary object 24.

Essentially, the mathematical process underscoring Formula 1 is subtraction of the coordinates of the stationary object 24 from each motion observation to complete the conversation. Exemplary results of such a process are illustrated in FIG. 2 on the converted longitudinal axis 26 and the converted latitudinal axis 28. The coordinates may start at zero, zero such that the stationary object 24 is placed in the center of the coordinate system 30. The coordinates increase positively or negatively as they move away from the center.

The PAV may be determined using Formula 2.

$$\sqrt{\frac{c_1^2 \times c_2^2}{c_3^2 \times c_4^2}} \quad \text{Formula 2}$$

As provided in Formula 2, each converted coordinate value ($c_1$, $c_2$, $c_3$, and $c_4$) may be squared to eliminate any negative values. The converted coordinate values latitude and longitude values may be multiplied with one another to convert the pair into a positional value. This positional value may represent the value of the position relative to the center (e.g., zero, zero). Furthermore, by squaring, the positional value folds all the coordinates into one 90° arc of a circle centered on the stationary object 24. This may allow position, direction, and value to be measured. The same operation may be performed upon the coordinate pair for the ending positional value of the object 11-20. The beginning positional value 1-10 may be divided by the ending positional value 11-20. This operation may produce a ratio that folds the concept of direction into the positional values at either end of the movement segment. After applying this value to a square root, the PAV is reduced to a usable dimension. An exemplary application of Formula 2 to the provided exemplary data is provided in Table 2.

TABLE 2

Calculations for Objects in Motion

| | X | Y | $\frac{X}{Y}$ | $\sqrt{\frac{x}{y}}$ |
|---|---|---|---|---|
| 1. → 11. | 2.4336 | 0.3969 | 6.1315 | 2.48 |
| 2. → 12. | 0.0225 | 0.0729 | 0.3087 | 0.55 |
| 3. → 13. | 0.0400 | 4.3264 | 0.0092 | 0.10 |
| 4. → 14. | 0.2304 | 0.0256 | 9.0000 | 3.00 |
| 5. → 15. | 0.0784 | 0.3600 | 0.2177 | 0.47 |
| 6. → 16. | 0.1089 | 0.0881 | 13.4444 | 3.66 |
| 7. → 17. | 0.5184 | 0.0081 | 64.0000 | 8.00 |
| 8. → 18. | 0.6400 | 0.0049 | 130.6122 | 11.43 |
| 9. → 19. | 0.0784 | 0.0009 | 87.1111 | 9.33 |
| 10. → 20. | 0.4624 | 0.1936 | 2.3884 | 1.55 |

The PAV produced by the disclosed systems and methods may represent the proximity, attraction, and direction of each of the objects 1-10. If the value is less than one, the object 1-10 may be determined to be traveling away from the stationary object 24. In the exemplary calculations provided in Table 2, this is illustrated by objects 2, 3 and 5. If the value is greater than 1, the object 1-10 may be determined to be traveling towards the stationary object 24. In the exemplary calculations provided in Table 2, this is illustrated by objects 1, 4, and 6-10. In such cases, the value may be determined to represent the amount of attraction and proximity to the stationary object 24. In the exemplary calculations provided in Table 2, object 8 has greater attraction than does object 10. This can be seen in FIG. 2 and Table 2. The greater the value of PAV, it may be determined that the corresponding object 1-10 has a more pronounced proximity and attraction. The objects 1-10 may be ranked by PAV and presented to a user.

Figure 4:
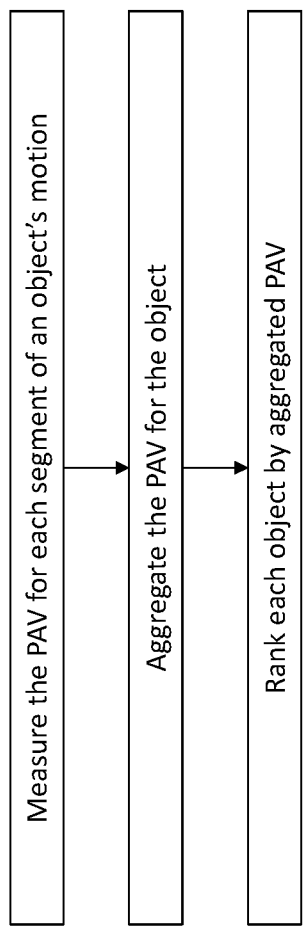
FIG. 4 is a flow chart with exemplary logic for determining an aggregate proximity and attraction between a stationary object and a moving object.

FIG. 4 is a flow chart with exemplary logic for determining an aggregate PAV between the stationary object 24 and the moving objects 1-10. One or more of the objects 1-10 may be observed over multiple segments of motion. The PAV value for a given object 1-10 may be determined for each segment of motion. The PAV value for each segment of a given object 1-10 may be aggregated. The aggregated value may be considered a measure of the object's 1-10 continuing interest in the stationary object 24, for example without limitation.

For example, without limitation, the stationary object 24 may be a product, a supply, or a piece of equipment within a warehouse, store, or other place of commerce. The objects 1-10 may be shoppers, selectors, or some other kind of purchaser. The coordinate system 30 may be applied to an internal building, warehouse, store, or other place of commerce. The stationary object 24 may be an office, breakroom, or any position within an office or place of work. The objects in motion 1-10 may be workers, customers, or any other individual working or visiting the office or work place. The coordinate system 30 may be applied to an office or work place, and may encompass multiple levels of a given building. Of course, these are just some exemplary applications, any application is contemplated. To provide more specific examples, again without limitation, the stationary object 24 may be a location within a building and monitoring may be performed to improve efficiency of workflow, such as, which groups work well together, which customers interact most with which products, which sales items have the greatest interest, some combination thereof, or the like.

The various objects described herein, such as but not limited to, the stationary object 24 and the moving objects 1-10 may each comprise electronic signal generating devices. For example, without limitation, some or all of the moving objects 1-10 may be personal electronic devices such as, but not limited to, smartphones, smart watches, laptops, tablets, computers, or the like. As another example, without limitation, some or all of the moving objects 1-10 may comprise RFID chips, GPS chips, wireless transmitters, magnetic sensors, some combination thereof, or the like. The electronic signal generating devices may be location tracking devices. The moving objects 1-10 may continuously or periodically transmit a signal indicating their position. The stationary object 24 may comprise one or more signal receiving devices configured to receive signals from the various moving objects 1-10 such that the location of the moving objects 1-10 may be tracked. Such tracking may be performed periodically or in substantially real-time. In other exemplary embodiments, the stationary object 24 may comprise one or more cameras configured to monitor the position of the moving objects 1-10, such as through automated image recognition software.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A method for determining proximity and attraction between a stationary object and a number of moving objects, said method comprising the steps of:
    taking a first location measurement of each of the moving objects;
    taking a second location measurement of each of the moving objects;
    applying each of the first location measurements and each of the second location measurements for each of the moving objects to a measurable coordinate system centered around the stationary object to arrive at a first converted location measurement and a second converted location measurement;
    transforming said first and second converted location measurements into a proximity/attraction value ("PAV");
    determining each of the moving objects having a PAV of less than one to be moving away from the stationary object; and
    determining each of the moving objects having a PAV of greater than one to be moving towards the stationary object.

2. The method of claim 1 further comprising the steps of:
    ranking each of the moving objects having a PAV greater than one by PAV.

3. The method of claim 1 wherein:
    each of the first location measurements comprise a first value and a second value;
    each of the second location measurements comprise a third value and a fourth value; and
    the step of transforming each of said converted location measurements into the PAV comprises the sub-steps of, for each moving object:
        determining a square of each of the first, second, third, and fourth values;
        multiplying the squared first value with the squared second value to arrive at a first product;
        multiplying the squared third value with the squared fourth value to arrive at a second product;
        dividing the first product by the second product to arrive at a resulting quotient; and
        applying a square root to the resulting quotient.

4. The method of claim 3 wherein:
    the first and third values comprise latitude measurements; and
    the second and fourth values comprise longitudinal measurements.

5. The method of claim 1 wherein:
    the location of at least some of the moving objects is measured by way of one or more cameras.

6. The method of claim 5 wherein:
    at least some of the moving objects comprise a location tracking device selected from the group consisting of: an RFID chip, a GPS device, a wireless transmitter/receiver, and a magnetic sensor.

7. The method of claim 6 wherein:
    the stationary object comprises a product, supply, or piece of equipment within a warehouse or retail establishment;
    the moving objects comprise shoppers, selectors, or purchasers; and
    the coordinate system reflects the floor plan of the warehouse or retail establishment.

8. The method according to claim 6 wherein:
    the stationary object comprises a location within an office building;
    the moving objects comprise workers; and
    the coordinate system reflects the floor plan of the office building.

9. The method of claim 1 further comprising the steps of:
    taking additional location measurement of each of the moving objects representing a second segment of movement for each of the moving objects;
    applying each of the additional location measurements for each of the moving objects to the measurable coordinate system centered around the stationary object;
    transforming each of said converted additional location measurements into the PAV to arrive at additional PAVs; and
    aggregating the PAV with the additional PAV for each of the moving objects.

10. A method for determining proximity and attraction between objects, said method comprising the steps of:
    selecting a stationary object;
    determining a location of the stationary object within a measurable coordinate system;
    identifying one or more objects in motion within a predetermined distance of the stationary object;
    determining the location of each identified object within the measurable coordinate system;
    making at least two positional observations of each identified object, wherein each positional observation comprises at least an X value and a Y value;
    converting the positional observations into a form where the measurable coordinate system is centered around the stationary object;
    calculating a square of each of the X and Y values for each of the positional observations for each identified object;
    multiplying the squared X values for each positional observation for each identified object with one another to arrive at a first product;
    multiplying the squared Y values for each positional observation for each identified object with one another to arrive at a second product for each identified object;
    dividing the first product by the second product for each identified object to arrive at a resulting quotient for each of the identified objects;
    applying a square root to the resulting quotients to arrive at a proximity/attraction value ("PAV") for each of the identified objects;
    determining identified objects having a PAV of less than one to be moving away from the stationary object; and
    ranking each of the identified objects having a PAV greater than one by their PAV to reflect the relative proximity and attraction of said identified objects to the stationary object.

11. The method of claim 10 wherein:
the measurable coordinate system is based on a global position.

12. The method of claim 10 wherein:
each of said X values comprise a latitude measurement; and
each of said Y values comprise a longitudinal measurement.

13. The method of claim 10 further comprising the steps of:
collecting positional data for each identified object during a first segment of motion and a second segment of motion, wherein each segment comprises a beginning point and an end point;
determining the PAV for each segment of movement of the identified object;
aggregating the PAVs from each segment of movement of the identified object; and
dividing the aggregated PAV by a number of segments observed, wherein the resulting quotient reflects a continuing attraction and proximity of the identified object to the stationary object.

14. A system for determining proximity and attraction between a stationary object and a number of moving objects, said system comprising:
at least one location measuring device configured to record a first and second location measurement of each of the moving objects, wherein each of said first location measurements reflect starting positions for the moving objects and each of said second location measurements reflect ending positions for the moving objects;
one or more electronic storage devices comprising executable software instructions, which when executed, configure one or more processors to:
convert each of the first and second location measurements for each of the moving objects into a form where a measurable coordinate system is centered around the stationary object;
transform each of said converted location measurements into a proximity/attraction value ("PAV");
identify each of the moving objects having a PAV of less than one as moving away from the stationary object; and
identify each of the moving objects having a PAV of greater than one as moving towards the stationary object.

15. The system of claim 14 wherein:
said location measuring devices are selected from the group consisting of:
cameras, RFID devices, GPS devices, wireless transmitters/receivers, and magnets.

16. The system of claim 14 wherein:
each of said first and second location measurements comprise a horizontal position value and a vertical position value.

17. The system of claim 16 further comprising:
additional executable software instructions stored on the one or more electronic storage devices, which when executed, configures the one or more processors to transform each of said converted location measurements into the PAV by, for each of the moving objects:
determining a square of each of the horizontal position values for each of the first and second location measurements;
determining a square of each of the vertical position values for each of the first and second location measurements;
multiplying the squared horizontal position value of the first location measurement with the squared horizontal position value of the second location measurement to arrive at a first product;
multiplying the squared vertical position value of the first location measurement with the squared vertical position value of the second location measurement to arrive at a second product;
dividing the first product by the second product for to arrive at a resulting quotient; and
applying a square root to the resulting quotient.

18. The system of claim 17 wherein:
each of the location measuring devices, the stationary object, and the moving objects are located in a building.

19. The system of claim 18 wherein:
said building is a retail establishment;
said stationary object is a consumer product; and
said moving objects are potential customers.

20. The system of claim 18 wherein:
each of said first position values comprise longitudinal measurements; and
each of said second position values comprise latitudinal measurements.

* * * * *